US005891579A

United States Patent [19]

Glende et al.

[11] Patent Number: 5,891,579

[45] Date of Patent: Apr. 6, 1999

[54] PROTECTIVELY COATED OUTDOOR FIXTURES

[76] Inventors: James A. Glende, 116 Mankato Ave., Winona, Minn. 55987; Russell K. Glover, IV, 2011 SW. 22nd Ave., Ft. Lauderdale, Fla. 33312

[21] Appl. No.: 974,616

[22] Filed: Nov. 19, 1997

Related U.S. Application Data

[62] Division of Ser. No. 553,145, Nov. 7, 1995, Pat. No. 5,731,042.

[51] Int. Cl.[6] .......................... B32B 27/26; B32B 27/06; B32B 27/30; B32B 27/36

[52] U.S. Cl. ...................... 428/424.6; 428/413; 428/447; 428/451; 428/483; 428/463; 428/473.5; 428/520; 428/522

[58] Field of Search .................................... 428/463, 413, 428/423.6, 424.6, 451, 454, 473.5, 483, 520, 522, 447; 427/518, 409, 410, 461, 470

[56] References Cited

U.S. PATENT DOCUMENTS

| | | | |
|---|---|---|---|
| 3,853,597 | 12/1974 | Shimizu et al. | 427/409 |
| 3,985,920 | 10/1976 | Travis | 427/385.5 |
| 4,045,600 | 8/1977 | Williams | 427/412.4 |
| 4,053,659 | 10/1977 | Gebauer et al. | 427/375 |
| 4,113,681 | 9/1978 | Harmuth | 428/327 |
| 4,154,887 | 5/1979 | Morhauser et al. | 427/412.4 |
| 4,267,221 | 5/1981 | Ishikawa et al. | 428/192 |
| 4,393,094 | 7/1983 | Garrett, Jr. et al. | 427/501 |
| 4,450,200 | 5/1984 | Iwato et al. | 428/323 |
| 4,504,374 | 3/1985 | Lewarchik et al. | 427/386 |
| 4,629,645 | 12/1986 | Inoue | 428/195 |
| 4,851,464 | 7/1989 | Wozniak | 427/409 |
| 5,475,056 | 12/1995 | Koesters et al. | 427/409 |

*Primary Examiner*—Diana Dudash
*Attorney, Agent, or Firm*—M. Paul Hendrickson

[57] ABSTRACT

Fixtures composed of a combination of a metallic core coated with a fused plasticized vinyl chloride coating and an overcoating barrier which shields the coating from atmospheric exposure possess superior resistance against outdoor weathering. The overcoating barrier protectively shields the plasticized vinyl chloride coating from microbiological and sunlight induced degradation. The fixture maintains the compositional integrity and appearance of a freshly manufactured fixture notwithstanding prolonged exposure to normally deteriorative weathering (e.g. bright sunlight, hot and humid) conditions. If desired, the protective barrier may include tractive imparting components which prevent slippage and improve upon surface traction. Thermosetting resins and especially the electrostatically applied powders particularly afford effective overcoating barriers for protectively shielding the plasticized vinyl chloride coating from degradation.

8 Claims, No Drawings

PROTECTIVELY COATED OUTDOOR FIXTURES

This application is a division of application Ser. No. 08/533,145 filed Nov. 7, 1995 now U.S. Pat. No. 5,731,042.

FIELD OF THE INVENTION

The present invention relates to metallic objects protectively coated with plastic coatings and more particularly to outdoor metallic fixtures coated with a unique protective coating combination.

BACKGROUND OF THE INVENTION

Outdoor furniture and fixtures exposed to public use and vandalism generally require an extremely durable structure. Such outdoor furniture and fixtures are often constructed of steel so as to provide the necessary structural strength and durability. Steel furniture and fixtures are prone to rust if not adequately protected against rusting. It is conventional to paint outdoor metallic fixtures with protective coatings so as to enhance the aesthetic features and protect the metallic furniture and fixtures against rusting. It is also conventional to paint such furniture and fixtures with paints formulated with thermoplastic film-forming substances. Unfortunately, the painted coatings are thin and prone to scratching or paint removal which mars the appearance and exposes the underlying metal to rusting.

Recreational picnic benches and tables, outdoor playground equipment, outdoor furniture, and other similar outdoor fixtures (generally referred to as fixtures herein) are exposed to extensive wear and tear and, therefore, by necessity require a very durable protective coating. Accordingly, more durable protective coatings than the conventional thermoplastic painted coatings is needed. It has, heretofore, been conventional to coat such outdoor furniture, and fixtures with a relatively heavy coating or overcoating of plasticized polyvinyl chloride generally known as plastisols, so as to provide more durable protection against physical wear. Unfortunately, polyvinyl chloride (PVC) coated fixtures, when exposed to sunlight and outdoor weathering conditions will inherently undergo chemical, physical and microbiological decomposition. Although pieces freshly coated a polyvinyl chloride coating typically exhibit a superior external appearance, exposure to hot and humid conditions (especially when disposed at a horizontal positioning) may result in rapid deterioration of the protective coating. This surface deterioration first appears as small black spots that slowly spreads over time. Subsequently, the PVC surface deterioration progresses to an “alligator hide” appearance. Such surface deterioration is often due to either fungal attack or ultraviolet (UV) degradation. Certain atmospheric borne corrosive chemicals, such as those commonly associated with acid rains, will also cause deterioration of the PVC coating.

Fungal attack is most prominent in hot and humid condition, such as commonly prevelant in southeastern section of the United States. Evidence of this phenomena is a “blackening” of vertical and horizontal positioned surfaces. Various types of microorganisms (particularly fungus), usually from the soil cling to the PVC surface, consume the plasticizer, culture and spread. Within months this can appear as an ever enlarging black area. A fungal retardant formulated in the polyvinyl chloride composition will inhibit or arrest fungal growth; however, it is expensive and usually entails a toxic fungicide such as arsenic.

Ultraviolet (UV) degradation prominently occurs in hot and arid conditions such as commonly prevalent in the southwestern section of the United States. A special type of ultraviolet degradation usually occurs only on horizontal surfaces and involves a slower degradative process than fungal deterioration. According to certain researchers, UV degradation may be attributed to the following factors:

A. Dirt accumulates and remains on horizontal PVC coated surfaces;

B. Dirt extracts (absorbs) plasticizer which accumulates on the surface;

C. Plasticizer is then degraded and photosynthesized by the sunlight; and

D. The degraded plasticizer catalytically degrades the fused PVC coating.

Formulating the PVC coatings with UV screeners will retard the UV degradation but will not effectively overcome the UV degradation problem.

Consequently, plasticized polyvinyl chloride coatings will typically undergo extensive discoloration and exhibit a dramatic change in external appearance upon exposure to these adverse weathering conditions. As indicated, these deterioration problems are accelerated by humid and warm climatic conditions, such as commonly prevalent in the southeastern regions of the United States of America. Metal furniture and fixtures coated with a protective polyvinyl chloride coating in such regions often become marred in appearance with pronounced blackened spots, which upon further weathering and aging, will become grotesquely discolored and unsightly in appearance. Attempts to formulate the coatings with fungicides and other microbiological preservatives have been ineffective. There exists a need to effectively protect plasticized polyvinyl chloride coatings formulated with conventional plasticizing reagents from chemical, fungal and UV degradation.

These degradative problems are compounded in outdoor playground equipment such as elevated decks, bridges, and ladders coated with the PVC. Treading upon the surface by children at play contributes to dirt accumulation and often wetness which conditions are particularly conducive to PVC degradation. Moreover, the surfaces may become slippery and unsafe especially when wet. Such slippery surfaces are accident prone and can be dangerous to young children. In PVC coated playground equipment there not only exists a need to protect PVC surfaces from degradation but a need to improve upon surface traction, thus improving safety by reducing potential accidents caused by slipping.

SUMMARY OF THE INVENTION

The present invention provides a unique protective barrier for PVC coated metallic objects which effectively protects and preserves plasticized vinyl chloride polymeric coating against discoloration and decompositional alteration upon weathering and aging. The barrier may be formulated so as to impart a tractive surface and thereby reduces accidental slippage on playground surfaces. Consequently, outdoor articles, such as playground equipment, furniture and other outdoor objects and fixtures, protectively coated with the overcoating embodiments of this invention will improve safety and maintain the appearance and quality of freshly manufactured plasticized polyvinyl chloride coated objects notwithstanding prolonged outdoor usage and exposure to unfavorable climatic weathering conditions.

In the preferred embodiments, the unique features of the present invention include a metallic base substrate coated with a plasticized polyvinyl chloride coating formulated with conventional plasticizing reagents and a protective overcoating barrier of an electrostatically deposited coating powder which, when fused and cured, provides a uniform, continuous, non-porous, cross-linked overcoating barrier protectively shielding the polyvinyl chloride coating against atmospheric exposure. The overcoating protectively envelopes and seals the polyvinyl chloride coating composition (including the plasticizing reagents) from atmospheric exposure to chemical and ultraviolet degradation and/or fungal attack. Park equipment such as benches, picnic tables, children's playground equipment, trash receptacles, grates, bridges and other similar fixtures coated with an intervening polyvinyl chloride coating and an overcoating barrier of the electrostatically applied thermosetting material offer a unique protective overcoating effective in protecting the polyvinyl chloride coatings against such traditional decompositional deterioration. Unlike conventional coatings, playground articles protectively coated with the protective overcoating barrier of the present invention, will effectively retain the original lustrous polyvinyl chloride coating attributes even after being adversely exposed for prolonged periods of time to hot and humid climatic conditions. If desired, the barrier may be effectively formulated so as to yield a tractive surface to reduce slipperiness and provide a more safe surface.

The present invention is particularly effective for use in the manufacture of coated polyvinyl chloride metallic outdoor furniture and fixtures (e.g. tables, benches, trash receptacles, playground equipment, etc.) protectively coated with a unique protective overcoating barrier. The tendency of such polyvinyl chloride coated furniture and fixtures to undergo chemical and/or microbiological decomposition is effectively alleviated by the present invention. The polyvinyl chloride coated fixtures overcoated with the unique overcoating barrier possess superior durability when compared to traditional techniques which fail to provide the protective embodiments as afforded by the unique manufacturing and manufacture of this invention.

DETAILED DESCRIPTION OF THE INVENTION

According to the present invention, there is provided a metal article comprised of a metallic core coated with a intervening polyvinyl chloride coating composition formulated with plasticizing reagent and an enveloping protective overcoating barrier which shields the vinyl chloride polymeric coating from atmospheric exposure. The present invention affords an effective means for immobilizing plasticizing reagents from migrational movement to the polyvinyl chloride coating surface. Shielding the polyvinyl chloride coating against atmospheric exposure coupled with the immobilization of the plasticizer within the interior regions of the vinyl chloride polymeric coating renders the plasticizer unavailable for aerobic microbiological infestation (e.g. fungal culturing), chemical and ultraviolet degradation. The barrier, therefore, protectively shields the vinyl chloride polymeric coating composition from plasticizer migration and undergoing microbiologically, ultraviolet and corrosive atmospheric induced deterioration upon weathering and aging. Shielding of the polyvinyl chloride coating surface from atmospheric exposure also protects the PVC surface against dust accumulation and migration of the plasticizer to the dust accumulates.

If desired, the overcoating barrier may provide a smoother and glossy finish appearance than the normal oven-cured polyvinyl chloride coated surface. If desired, the overcoating barrier may be designed to improve upon playground equipment safety by providing a rough, dull and tractive surface designed to improve upon surface traction.

When exposed to ultraviolet light and hot climatic conditions, plasticizing reagents of conventional polyvinyl chloride coating formulations tend to migrate to the coating surface. The exposed plasticizing reagent coupled with the porous passageways created by such migration renders the polyvinyl chloride coating particularly vulnerable to microbiological attack and other types of degradation. Shielding the PVC coating from external exposure prevents the accumulation of dirt at the PVC surface, migration of plasticizing reagent to the surface and concomitant chemical UV or fungal degradation of the plasticizing reagent and polymer. Enveloping and sealing of the underlying polyvinyl chloride coating layer immobilizes the plasticizing components of the polyvinyl chloride coating from migrating towards an atmospherically exposed surface area which, in turn, inhibits concomitant degradation of the polyvinyl chloride coating. Failure of the protective overcoating barrier to provide sufficient shielding coverage results in an underlying polyvinyl chloride coating susceptible to corrosive chemicals, microbiological attack and UV degradation. The overcoating barrier preferably hermetically seals the intervening vinyl chloride polymeric coating composition from atmospheric exposure. The enveloping overcoating barrier preferably possesses sufficient structural and compositional continuity so as to hermetically seal the intervening polyvinyl chloride coating composition from atmospheric exposure. The overcoating barrier should also possess sufficient resistance against aging so as to retain its protective overcoating barrier attributes upon weathering and aging.

Polyvinyl chloride compositions useful in preparing the intervening coatings for the articles of the present invention includes both homopolymers and copolymers of polyvinyl chloride polymerizates. Illustrative vinyl chloride copolymers include vinyl chloride copolymers in which the vinyl chloride monomer is copolymerized with minor amounts of ethylenically unsaturated comonomers compatible with the vinyl chloride (e.g. ethylenically unsaturated halides such as the ethylene di- and tri-chlorides, vinylidene chlorides, vinyl acetate, acrylate esters, etc.) which do not detract from the efficacy of the vinyl chloride polymer as an outdoor protective coating. Polyvinyl chloride coating compositions particularly effective herein are those vinyl chloride polymeric coating compositions currently commercially available in the form of thick pastes which, when overcast upon the metallic base fixture and fused, provide a durable overcasted PVC coating. These vinyl chloride coating compositions typically contain relatively large amounts of plasiticizers and are often commonly referred to as "plastisols". These plastisols generally comprise a suspension of vinyl chloride polymeric particles dispersed in a plasticizer carrier. The polyvinyl chloride are particles uniformly dispersed in the liquid plasticizing carrier typically have an average particle size ranging from about 2 to about 12 microns in diameter. The plasticized polyvinyl chloride coating compositions are typically formulated with a relatively large amount of plasticizer, such as at least 20 parts by weight plasticizer for each 100 parts by weight of polyvinyl chloride homopolymer or copolymer particles. The plasticizer, due to its relatively high molecular weight and nonvolatility, will remain within the coating along with the polyvinyl chloride resin when cast and cured upon a metal substrate at curing temperatures in excess of 360° F. The plasticizer imparts flexibility and protects the coating from becoming brittle. Although any plasticizer serving to plasticize the vinyl chloride polymeric coating composition may be utilized, the most commonly used plasticizing agents include branched and unbranched (e.g. straight chain) aliphatic (e.g. $C_6$–$C_{18}$)

phthalates. Illustratively plasticizing reagents for the vinyl chloride composition include the phthalate esters such as di-2-ethyl hexyl phthalate, di-isodecyl phthalate, nonyl phthalate, and undocyl phthaltes, etc. mixtures thereof and the like. A relatively small amount of epoxy plasticizer may also be formulated into the coating composite to enhance heat stability. These plasticized polyvinyl chloride coating compositions are typically formulated with one or more conventional heat and/or light stabilizers, fillers and colorant such as organic and inorganic pigments which impart the desired coloring and pigmentation to the coated object.

The polyvinyl chloride coating compositions or plastisols useful for coating the articles herein will typically be formulated to hardness ranging from about 80 to about 90 Shore A but need not necessarily be limited to this hardness range. Typical PVC coating formulations (in parts by weight) are as follows:

| | 80 Shore A | 90 Shore H |
|---|---|---|
| Vinyl chloride dispersion resin | 60 | 60 |
| Larger particle size PVC blending resin | 40 | 40 |
| Di-2-ethyl hexyl phthalate plasticizer | 60 | 42 |
| Epoxy plasticizer | 5 | 5 |
| Barium, zinc, phosphite stabilizer | 3 | 3 |
| Color pigments | variable | variable |

In general, the larger sized polyvinyl chloride blending resin particles tend to reduce paste viscosity while the smaller sized vinyl chloride polymeric dispersion resin particles tend to increase paste viscosity. The "plastisol" may be formulated with a volatile diluent (e.g. referred to as "organosols") which serve to decrease paste viscosity. The plasticizer levels (based upon 100 parts by weight polyvinyl chloride) suitable for dip coating may generally range from about 200 parts by weight plasticizer for soft coatings to about 20 parts by weight plasticizer for very hard coatings. For most applications, the weight ratio of plasticizer weight to vinyl chloride polymer weight of the plastisol in the dispersion will range from about 1:3 to about 1:1 and most typically from about 1:2 to about 2:3.

Proper processing conditions should be used in applying the vinyl chloride coating so as to provide a uniform and continuous intervening polyvinyl chloride coating upon the metallic substrate. If organosols or other constituents volatile at the fusion temperature (e.g. 360° F.) are formulated into the polyvinyl chloride coating composition, particular care should be exercised to avoid the creation of porous intercies which expose the vinyl chloride coating to the external atmosphere. Porosity within the vinyl chloride coating increases exposed surface area and creates more difficulties in effectively shielding the porous intercies with the protective barrier. Use of molten salt (as opposed to air drying) to cure and set the polyvinyl chloride coating tends to create a porous coating structure which is considerably more difficult to protectively seal against atmospheric exposure than the more uniform coatings obtained by curing the vinyl chloride polymeric coating in an air oven at elevated curing temperatures. Fusing and bonding the polyvinyl chloride at elevated fusing temperature provides an appropriate substrate for effectively applying the barrier overcoating thereto.

The fused and bonded vinyl chloride coating composition is protectively shielded by a protective overcoating barrier. Although certain thermoplastic materials possessing sufficient thermal stability (e.g. elevated melting points resistance towards flow) and physical integrity when exposed to intense sunlight or UV exposure and/or hot and humid conditions (e.g. 95° F. and 90% relative humidity) and/or corrosive acid rain producing atmospheric conditions may be utilized as a overcoating barrier herein, those barrier forming materials generally classified as thermoset resins which, upon curing, cure into a substantially impervious cross-linked, overcoating barrier provide more effective protection to the plasticized PVC coating. Particularly effective protective overcoating barrier components are the thermosetting polymeric materials (especially those derived from an electrostatically applied thermosetting polymeric powders) which, when heated to an elevated temperature fuse and cure into a uniform, continuous thermoset barrier of sufficient topographical coverage so as to protect the polyvinyl chloride coating (including the plasticizer) from chemical and microbiological degradation. Efficacy of the overcoating barrier may be determined by placing test panels within natural or artificial testing environments and visually observing whether or not the protective barrier protected the PVC coating. Conventional testing techniques such as by exposing the test panels to a southerly exposure slanted at a 45 degree angle under hot and humid test conditions or alternatively under artificial test conditions barrier (e.g. for hot and humid UV light at 90° F. and 90% relative humidity) may be used. Natural outdoor testing and exposure may require a somewhat longer testing period but are generally more reliable than the results obtained by artificial tests. Microbiological infestation under the latter mentioned Southeast test conditions will typically be visually observed by a macroscopic appearance of darkened spots (e.g. typically within 180 days) which cannot be simply removed by manually wiping a dampened cloth across the surface of the darkened spot.

Electrostatically applied powders which, upon curing, form a uniform, non-porous, cross-linked, enveloping exterior coating are particularly effective for use as the overcoating barrier. Thermosetting powders (adapted for electrostatic applications) generally comprise resinous polymeric materials characteristically containing multiple reactive sites which, under the reaction conditions (e.g. such as curing), cross link with polyfunctional cross-linking reagents to create a cross-linked polymeric structure. Such electrostatically thermosetting powders are available from numerous commercial sources and manufacturers. The electrostatically applied powders are suitably formulated to provide the appropriate hardness and flexibility to protect the coating from damaging impacts and sufficient exterior durability to maintain its chemical and physical integrity upon prolonged outside exposure under adverse climatic conditions.

Unlike thermoplastics, cured thermosetting resins tend to decompose, without melting, when heated to a thermally decomposing temperature. Illustrative resinous polymeric materials which contain or serve as precursor for providing multiple cross-linked reaction sites for reaction with an appropriate cross-linking agent include the fluorinated resins, the acrylic resins, the epoxy resins, the epoxy-polyester resins, the polyester resins, the acrylsilicone resins, the modified silicon resins, and the polyimide resins. Thus, in addition to the polymeric resinous material, the thermosetting resins are typically formulated with a cross-linking agent or a cross-linking precursor, or a reaction catalyst such as isocyanate, organic peroxide, azo compound, amine, amide, a benzoin derivative, acid anhydride, or an acid or alkali catalyst which form a cured organic resin layer by a setting reaction such as a cross-linking reaction, a dehydrating polymerization, or a radical polymerization after thermal fusion. The thermosetting reaction is generally promoted by heat, but may also be promoted by irradiation of an energy beam such as ultraviolet light, radiation, electron beam, or ion beam. The thermosetting resin may be composed of a single polymeric resinous material, or a mixture of different resins, or a laminar structure of different resins. Particularly effective for use as an overcoating barrier are the thermosetting coating compositions which require elevated temperatures (e.g. greater than 100° C.) in order to activate the cross-linking reactants and cure the reactants into the desired cross-linked overcoating barrier. The thermally activated cross-linking compositions are often commercially manufactured by chemically blocking reactive sites with a blocking reactant which requires heat to remove from the reactive sites. Illustrative conventional blocking agents for blocking reactive sites are disclosed (for example) in Col. 3, lines 49–65, U.S Pat. No. 5,091,475 by Potter et al. Such blocking agents generally require elevated temperatures (e.g. about 150° C. to about 220° C. and preferably from about 170° C. to about 190° C.) to remove a blocking agent from the blocked reactive sites and for completing the cross-linking reaction.

The thermosetting resinous powders may be formulated, if desired, with or without organic and inorganic coloring additives. In the preferred embodiments of the invention, the thermosetting resinous powder include sufficient inorganic oxides to impart the desired coloring to the overcoating barrier. Examples of the inorganic oxide particles or pigments include MgO, $ZnO_2$ and $TiO_2$. Various ultraviolet absorbing organic compounds for absorbing the ultraviolet light may be added to the thermosetting organic resin, in addition to said inorganic oxide. Adhesion additives to improve the adhesion between the polyvinyl chloride coating and overcoating such as a small amount of a silane coupling agent or an organo-metallic compound such as an organic titanate may be added to the coating.

High gloss finishes, flat and textured finishes or other finished surface attributes may be achieved through the appropriate formulation of the overcoating barrier composition. Certain uses such as park benches, park tables, trash receptacles, playground slides, etc. may be appropriately overcoated with a high gloss barrier. In other applications wherein safety and tractive surfaces are of prime concern (e.g. steps, platforms, etc.), overcoatings which impart a textured or rough surfaced overcoating barrier may be used. Incorporation of textured substances such as sand, pigments, etc. into the overcoating formulation permits the overcoating barrier to shield the polyvinyl chloride coating while also providing the desired degree of non-slip or surface traction to the overcoating barrier. Conventional flattening agents (e.g. $SiO_2$, $Al_2O_3$, etc.)which create a flat or matte finish may also be incorporated into the formulation. Altering the thermosetting resins so as to yield a matte finish (e.g. see U.S. Pat. No. 5,091,475) may provide another alternative for producing or contributing to the textured finishes.

The top coating or overcoating barrier should provide a protective coating for shielding the PVC coating from atmospheric exposure. The overcoating barrier should possess sufficient environmental stability to withstand degradation and maintain its protective overcoating attributes upon weathering. Certain regions of the United States are more conducive to major degradative activities than other areas and, therefore, provide a suitable natural environment for conducting the tests upon the efficacy of the overcoating barrier. For example, Southern California and particularly within the Los Angeles metropolitan area provides a suitable test site for testing the overcoating barrier efficacy against corrosive atmospheric conditions such as acid rain producing atmospheric environment. The Phoenix metropolitan region provides a particularly suitable site for ultraviolet resistance whereas Florida (e.g. Jacksonville, Fla.) serves a particularly suitable site for testing fungal induced degradation. The test period will typically include the summer months since this provides maximum sunlight and heat exposure and will involve either the spring or fall months or both the spring and fall as well as the summer months. In general, protectively overcoated fixutres capable of withstanding 180 degrees of hot and humid outdoor exposure in Florida will afford a significant improvement in PVC weathering attributes.

Especially effective as an overcoating barrier are those barriers derived from the elestrostatically applied and ovencured polyesters. Such polyester resins may be prepared by direct esterification of a carboxylic acid compound with a polyfunctional alcohol compound, such as ethylene glycol. Examples of the carboxylic acid compound utilized for the esterification are: terephthalic acid, isophthalic acid, phthalic acid, succinic acid, glutaric acid, adipic acid, sebacic acid, beta-oxypropionic acid, oxalic acid, maleic anhydride, trimellitic anyhdride, pyromellitic acid, mixtures of these compounds and the like compounds. Further exemplary polyfunctional alcohols and carboxylic acids disclosed in U.S. Pat. No. 4,184,031, beginning on line 52 of Col. 6 through line 48 of Col 9. Examples of the polyfunctional alcohol compound utilized for the esterification are: ethylene glycol, diethylene glycol, propanediol, butanediol, pentanediol, 1,6-hexanediol, neopentyl glycol, 2,2'-diethylene propanediol, cyclohexanediol, trimethylolpropane, pentaerythritol, polypropylene glycol, and mixtures of these compounds and the like compounds. Examples of the polyfunctional alcohol are: ethylene glycol, diethylene glycol, propanediol, butanediol, pentanediol, 1,6-hexanediol, neophentyl glycol, 2,2'-diethylene propanediol, cyclohexanediol, trimethylolpropane, pentaerythritol, polypropylene glycol and the like. The examples of the blocking agent are: methanol, ethanol, e-caprolactam, 2-pyrrolidone, methylethyl ketone oxime, acetoxime, phenol and the like. In the blocked isocyanate compound, the blocked isocyante group generates a free isocyanate group by dissociation of the blocking agent and the generated free isocyanate group reacts with the hydroxyl group in the polyester resin. Polyester powder coating compositions formulated with triglycidal isocyanurate and often referred to as TGIC-polyester powder coating compositions represent another grouping of effective barrier overcoatings for use herein. Powder coating adjuncts formulated with polyester resin component include isocyanate compounds, polyhydric alcohols, blocking agents, carboxylic acid compounds, inorganic pigments, such as titanium dioxide, carbon black, iron oxides, yellow lead and the like; organic pigments, such as phthalocyanine green, phtyalocyanine blue and the like; fillers, such as barium sulfate, mica, tarc, zinc oxide and the like; metal powders, such as aluminum powder, copper powder, nickel powder and the like; dyes; pigment dispersants; surface conditioners; catalysts and the like. The polyester resin is preferably a solid resin at the room temperature having an average of two or more hydroxyl groups per molecule.

In another embodiment of the invention, there is provided a method for manufacturing an outdoor fixture comprised of a metal base coated with a plasticized polyvinyl chloride coating overcoated with an overcoating barrier which protectively shields the polymeric coating from atmospheric exposure, said method comprising:

a) priming the metal base of the fixture so as to provide a primed metal base with a primed surface adapted for applying the polymeric coating;

b) coating the primed surface with a plasticized polyvinyl chloride coating composition to provide a metal base product coated with the plasticized polyvinyl chloride coating; and c) applying an overcoating barrier to the product so as to protectively shield the polymeric coating from atmospheric exposure.

The coating of the metal base with a plasticized polyvinyl chloride coating generally involves initially placing the metal substrate surface in a suitable condition for applying the polyvinyl chloride coating to the substrate. This preferably involves cleaning and degreasing the metallic substrate with industrial power washers (e.g. aqueous washes) or in degreasing vapor baths (e.g. boiling trichloroethylene) or other appropriate means to remove residual oil, grease, and dirt from the metal surface so as to permit more surface for effective bonding of a polyvinyl chloride primer to the metallic surface. The degreased surface in the most preferred procedure may then subjected to a shot blasting technique which minutely pits the metallic surface and provides a surface conditioned for more effective bonding of the polyvinyl chloride primer coating to the substrate. Priming of the metal surface may then be accomplished by immersing the metal substrate in a tank containing a conventional polyvinyl chloride primer formulated especially for use with polyvinyl chloride coatings. Illustrative primers include water based urethanes, epoxy, phenolics, acrylates and the like. After applying the primer, the primed steel substrate may then be heated to an elevated temperature so as to remove the volatile constituents from the primer and provide a uniformly primed surface coating suitable for applying a polyvinyl chloride coating thereupon.

The viscosity of plasticized vinyl chloride coating compositions will significantly change upon heating. Characteristically, the plastisol compositions upon heating tend to progressively decrease in viscosity until heated to a temperature of about 130° F., after which further increases in temperature tend to rapidly increase plastisol viscosity until solvation and fusion occurs. The maximum viscosity temperature for any given plasticized polyvinyl chloride formulation will depend upon the particular polyvinyl chloride type resin, plasticizer type, and other formulated ingredients. Immersion of the heated primed metal base (e.g. base heated to 130° F.) in the plasticized PVC bath typically forms a viscous gel coating about the heated object. Utilizing these characteristics, a particularly effective technique of bonding polyvinyl chloride coating composition (i.e. plastisol) to the primed metal base involves heating the clean, degreased and primed metallic object to an oven temperature ranging from about 550° F. to about 675° F. for 3½ minutes such that part is heated to about 275° F. to about 300° F. when immersed in the plastisol bath. This results in a liquefied polyvinyl chloride plastisol (as a gel-like substance) uniformly and evenly cast about the primed metal base. Coating thickness (advantageously between about 50 mils to about 250 mils thick and preferably from about 80 mils to about 150 mils thick) may be effectively regulated by controlling the temperature of the immersed primed metal base and the time interval the heated metallic object remains immersed in the bath.

Effective bonding of the gel-like overcasting plastisol to the primed metal base surface may be achieved by passing the casted object through a heated oven with a sufficient residence time to fuse the polyvinyl chloride polymeric particles and plasticizing reagents into a fused homogenous mass. Typically the gel-coated metal base product, when placed in an air oven and heated to about 450° F. (i.e. the fusion temperature approximately 360° F. which may vary depending upon plastisol type), converts the vinyl chloride polymeric and plasticizer to the desired homogenous mass.

The resultant vinyl chloride coated metal base product may then be overcoated with the atmospheric shielding barrier. As previously pointed out, the preferred method involves depositing an electrostatic powder upon the PVC coated metal base product. Electrostatically applied powder deposition efficacy is enhanced by heating the metal base to increase transfer efficiency. In the most preferred embodiments of the invention, the resultant polyvinyl chloride coated product is heated to a temperature of about 100° F.–120° F. and then electrostatically applying an electrostatic powder overcoating which, when heated to an appropriate elevated temperature in an oven, uniformly flows and fuses about the polyvinyl chloride coating to provide an enveloping hermetically sealed exterior coating about the surface of the polyvinyl chloride coated substrate. In the electrostatic overcoating process, the electrostatically charged plastic powder particles are sprayed upon the polyvinyl chloride coated substrate of a oppositely charged polarity (e.g. substrate typically grounded) to the charged particles. The charged powder particles are electrostatically attracted to the grounded substrate which provides a uniform and uncured powder overcoating upon the grounded substrate with the powders electrostatically retaining the deposited positioning upon the substrate so long as the grounded conditions exist. The powder may be applied by apparatus conventionally used in applying the electrostatic powder coating, which are generally classified as being of the corona charging type or tribo charging type. The corona charging type is superior in providing a larger amount of charging but may lack selectivity in the resin to be coated. Tribo charging type affords coating efficiency and smoother finish even for single thick coating applications. The average particle size of the powdered resin is preferably as small as possible, because the coated surface becomes smoother and the film thickness distribution becomes smaller with smaller particle size. A particle size ranging from about of 1 to 100 μm, and preferably about 10 to 50 μm is advantageously employed.

Upon achieving the desired uniform deposition of overcoating powders about the deposited overcoating, the electrostatically applied powders are cured to the desired thermoset overcoating barrier. Typically the deposited electrostatically charged particles are heated sufficiently to cause the powder to melt and flow together to form a liquefied or molten overcoating. Although certain catalysts will lower the curing temperature, heating generally causes the coating materials to harden and ultimately cure into a desired rigid thermoset overcoating. The electrostatic deposition and curing of the electrostatically applied thermoset resin provides for a more uniform, tenacious, and durable overcoating hermetically sealed against atmospheric exposure. The overcoating of uncured resinous powder is obtained by electrostatically applying the powder over the entire polyvinyl chloride coating surface with electrostatic coating apparatus of the corona charging type or tribo charging type.

The manufacture preferably results in the creation of a uniform, enveloping, non-porous exterior overcoating barrier which protectively shields and prevents the plasticizer from migrating to the polyvinyl chloride coating surface and protects the polyvinyl chloride coating from microbiologically and ultraviolet induced degradation. As a result, the electrostatically and fused overcoating barrier prevents the external elements from degrading the internal components of the polyvinyl chloride substrate. It is believed that migration of the plasticizer is effectively inhibited or alleviated since there exists, in essence, no place for the plasticizer to migrate within the protectively encapsulated coating barrier as provided by this invention. Differences in vapor pressure created by external environmental conditions is effectively controlled by the overcoating barrier. Since the overcoating barrier prevents the establishment of atmospheric exposed porous intercies channeling into the interior of the polyvinyl chloride coating, the present invention effectively inhibits microorganisms (including fungi) from penetrating into the interior coatings and decomposing such coatings. The development of dirt, moisture and other factors conducive to microbiological attack of the polyvinyl chloride substrate is effectively alleviated pursuant to the present invention. If desired, the overcoating barrier may be of the type to improve upon the tractive character of the article. In the case of playground surfaces, the barrier coat offers a rough safer traction surface for improve safety for accident-prone children or other safety considerations.

The following examples are illustrative of the invention.

EXAMPLE 1

Trash receptacles of a thirty-two gallon capacity comprised of an open-meshed circular bin and flat top covering equipped with a trash receiving throat opening were fabricated from 3/16" flat steel stock for the cover, 24" circular diameter hoops constructed from rod stock hoops (3/8" diameter) and diamond-meshed steel mesh (3/4" No. 9) cut to a length of about 76.12" and a width of 30". The metal hoops were laterally positioned about 29" apart and the steel mesh was wrapped about the circumference of the hoops so that one hoop (a top hoop) margined along one width edge of the mesh and the other (a bottom hoop) margined along an opposite width edge. This created a circular bin measuring 30" in height and a 24" diameter with both ends of the bin open. The butt ends abutting together margining along the lengthwise ends were then welded together to form a cylindrical receptacle open at both the top and bottom ends. A flat top cover measuring 24 1/4" in diameter and 1 5/8" in height equipped with a downwardly extending periphery lip for closure onto the top brim of the bin section and a circular center throat opening measuring 8 1/2" in diameter with 1 5/8" downwardly extending flange for receiving the trash was fabricated by stamping the top cover from about a 26" flat, 14 Ga sheet metal stock.

The fabricated receptacle metal pieces were cleaned and degreased in industrial aqueous cleaning power washers to remove residual oil, grease and dirt from the pieces. The degreased pieces were then shot blasted with S330 metal ball shot supplied by Carpenter Brothers in Minneapolis, Minn. and flow coated with metal WB 1425 Clear primer sold and distributed by PLAST-O-MERIC, Inc., 21300 Doral Road, Waukesha, Wis. 53186. The primed metal pieces were then preheated in an air heated oven maintained at about 600° F. for 3 1/2 minutes, after which the primed metal pieces preheated to about 285° F. were immersed in a plasticized polyvinyl chloride coating composition (plastisol commercially available of 88 Shore A hardness, distributed by PLAST-O-MERIC, Inc. 21300 Doral Road, Waukesha, Wis. 53186 of a formulation as generally described on page 7 above) for about one minute and thereafter placed in a preheated air oven maintained at 450° F. for 10 1/2 minutes which fused the plastisol into a homogenous mass firmly bonded to the primed surface and metal pieces. Effective bonding and development of good physical properties of the polyvinyl chloride composition to the primed surface necessitates that the surface attain a temperature of 350° F. or higher. The resultant brightly and lustrous fused coating measured approximately 0.075–0.150 inch in thickness.

Random pieces of the fused polyvinyl chloride coated bins were used for comparative test purposes while the remaining receptacles were overcoated with a protective overcoating barrier for shielding the polyvinyl chloride coating from atmospheric exposure.

Overcoating was accomplished by preheating and maintaining the polyvinyl chloride coated pieces at 110° F. while applying an electrostatic thermosetting powder to the preheated pieces. The powder coating was electrostatically applied to the pieces with a powder coating apparatus of the corona (distributed by Ransbury-Gema) at applied voltage of 90 KV. The thickness of the electro-deposited resin was about 0.002–0.005 inches and uniformly covered the overcoated pieces. A commercially available electrostatic polyester powder sold and distributed by Spraylat Corporation, 3333 N. Interstate 35, Gainesville, Tex. 76241, (Chocolate full gloss TGIG PP9210D) was used to provide the overcoating shielding barrier. Applications of the negatively charged TGIC-polyester electrostatically to the grounded pieces resulted in a uniformly applied electrostatically applied coating which, upon oven curing yielded a cured cross-linked overcoating barrier measuring about 0.002–0.005 inch in thickness which effectively shields the underlying polyvinyl chloride coating from atmospheric exposure and concomitant degradation.

Curing of the powder coating was effectuated in a conventional air oven maintained at 425°–450° F. for forty-five (45) minutes. The oven heating cured the overcoating barrier into a cross-linked polymer securely bonded to the polyvinyl polymeric coating and shielding the coating from atmospheric exposure.

Exposure of the receptacle coated only with the fused plastisol to southeastern U.S. test conditions (e.g. Jacksonville, Fla.) resulted in relatively rapid degradation (e.g. after 180 days) of those test pieces simply coated with the polyvinyl chloride coating. In contrast, the test pieces overcoated with the electrostatically applied and cured polyester overcoating barrier retained the appearance of freshly manufactured pieces within the same test period without any evidence of degradation. Protracted testing exposure of the pieces protectively overcoated with the cured polyester overcoating barrier failed to reveal any evidence of overcoating barrier failure or degradation of the PVC undercoating.

EXAMPLE 2

In this example, there was prepared a a platform having an overcoating barrier with a tractive surface. A platform section for use as an elevational platform for playground equipment was fabricated with an overcoating barrier adapted to provide tractive underfooting. The platform section was fabricated from grated diamond steel mesh (3/4, No. 9) cut to a 4'×4' size and tubular steel angle stock 2"×2"×1/4" sized so as to mate onto the 4'×4' peripheral margin of grated steel which were then welded together to provide a rectangular-shaped platform section. The platform section was cleaned and degreased, primed with a metal primer in same manner as the trash receptacle of Example 1. The plasticized polyvinyl chloride coating and fusing of the platform section therewith was conducted pursuant to the manufacturing procedure of Example 1, except that brown plastisol was used in lieu of neutral plastisol of Example 1. This plastisol was formulated by admixing Plast-O-Meric Neutral (PLAST-O-Meric, Inc., 21300 Doral Road, Waukesha, Wis. 53186) with DX2180B with 1% by weight of brown pigment K&N BRPIG. For test purposes, certain of the PVC coated platform section were used for comparative testing while the remainder was overcoated with tractive surfaced barrier overcoating.

Overcoating with the shielding barrier was accomplished by the procedure outlined in Example 1 except that a textured powder was used as the overcoating shield barrier material. This powder was Chocolate Textured TGIG polyester PPT12544D manufactured and distributed by Spraylet Corporation, Gainesville, Tex. Comparative testing pursuant to the Exampe 1 test conditions of platform sections with and without the shielding barrier revealed relatively rapid degradation of the unshielded platform section while the protectively barrier shielded section maintained structural integrity without any visible evidence in deterioration of the PVC or the tractive surface. The tractive surface improved upon the safety and use of the platform while also providing a protective barrier for shielding the PVC coating from premature weathering and degradation.

What is claimed is:

1. An outdoor fixture possessing enhanced resistance against microbiological deterioration, said fixture consisting essentially of a metal base structure having a primed metal surface, an external overcoating barrier of a cured polymeric material consisting essentially of an electrostartically charged thermoset powder and an intervening plasticized vinyl chloride polymer coating disposed between said metal base and said overcoating barrier, with said external overcoating barrier protectively shielding said plasticized vinyl chloride polymeric coating from atmospheric exposure.

2. The outdoor fixture according to claim 1 wherein the overcoating barrier forms a substantially continuous overcoating barrier.

3. The outdoor fixture according to claim 1 wherein the intervening plasticized polymer coating comprises a homogenous fused blend of a vinyl chloride polymer and a plasticizer for said polymer.

4. The outdoor fixture according to claim 3 wherein the fused blend contains at least parts by weight plasticizer agent for each 100 parts by weight vinyl chloride polymer.

5. The outdoor fixture according to claim 4 wherein the cured polymeric material is cured to form a cross-linked overcoating barrier and the weight ratio of the plasticizer weight to vinyl chloride polymer weight ranges from about 1:3 to about 1:1.

6. The outdoor fixture according to claim 5 wherein the cured polymeric material is an electrostatically applied thermosetting polyester powder thermally cured to a substantially uniform and continuous cross-linked overcoating barrier.

7. The outdoor fixture according to claim 2 wherein the overcoating barrier includes a tractional imparting component for improving upon the tractional character of the overcoating barrier.

8. The outdoor fixture according to claim 2 wherein the overcoating barrier comprises a thermosetting polyester resin.

* * * * *